(12) United States Patent
Ouyang et al.

(10) Patent No.: US 10,454,989 B2
(45) Date of Patent: Oct. 22, 2019

(54) APPLICATION QUALITY OF EXPERIENCE EVALUATOR FOR ENHANCING SUBJECTIVE QUALITY OF EXPERIENCE

(71) Applicant: Verizon Patent and Licensing Inc., Arlington, VA (US)

(72) Inventors: Ye Ouyang, Piscataway, NJ (US); Carol Becht, Boonton, NJ (US); Krishna Pichumani Iyer, Aurora, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 313 days.

(21) Appl. No.: 15/047,728

(22) Filed: Feb. 19, 2016

(65) Prior Publication Data

US 2017/0244777 A1 Aug. 24, 2017

(51) Int. Cl.
*H04L 29/06* (2006.01)
*H04L 12/24* (2006.01)
*H04L 12/26* (2006.01)

(52) U.S. Cl.
CPC ............ *H04L 65/80* (2013.01); *H04L 41/142* (2013.01); *H04L 41/5067* (2013.01); *H04L 43/08* (2013.01)

(58) Field of Classification Search
CPC ....... H04L 65/80; H04L 43/08; H04L 41/142; H04L 41/5067
See application file for complete search history.

(56) References Cited

U.S. PATENT DOCUMENTS

| | | | | |
|---|---|---|---|---|
| 6,490,320 B1* | 12/2002 | Vetro | ..................... | H04L 29/06 375/240.08 |
| 7,298,736 B1* | 11/2007 | Matthews | ......... | H04L 29/06027 370/252 |
| 9,088,768 B1* | 7/2015 | Bordner-Babayigit | ..................... | H04N 17/00 |
| 9,237,339 B1* | 1/2016 | Bordner-Babayigit | ..................... | H04N 17/00 |
| 2008/0155087 A1* | 6/2008 | Blouin | ................ | H04L 41/5006 709/223 |

(Continued)

OTHER PUBLICATIONS

"Model." Dictionary.com Unabridged. Based on the Random House Unabridged Dictionary, © Random House, Inc. 2018. <URL: https://www.dictionary.com/browse/model>. (Year: 2008).*

(Continued)

*Primary Examiner* — Philip J Chea
*Assistant Examiner* — Wing Ma

(57) ABSTRACT

A method to enhance a subjective quality of experience for an application may include receiving network performance data, the data representing at least one observable application characteristic, and the subjective quality of experience (QoE) survey data. The method may further include generating at least one perception model which relates the data representing at least one observable application characteristic and the network performance data, and determining a QoE model which relates the subjective QoE survey data and the data representing at least one observable application characteristic. The method may further include inverting the at least one perception model and the QoE model to obtain a relationship between network performance parameters and the at least one observable application characteristic, and adjusting network parameters based on the at least one inverted perception model and inverted QoE model.

20 Claims, 9 Drawing Sheets

(56) References Cited

U.S. PATENT DOCUMENTS

| | | | | |
|---|---|---|---|---|
| 2009/0019353 | A1* | 1/2009 | Abrams | G06F 17/2247 715/224 |
| 2010/0135171 | A1* | 6/2010 | Jung | H04L 41/5009 370/252 |
| 2010/0268524 | A1* | 10/2010 | Nath | H04L 67/22 703/23 |
| 2010/0269044 | A1* | 10/2010 | Ivanyi | G06Q 30/02 715/736 |
| 2012/0151078 | A1* | 6/2012 | Puthenpura | H04L 43/0882 709/231 |
| 2013/0003605 | A1* | 1/2013 | Peterson | H04L 41/0826 370/255 |
| 2013/0007259 | A1* | 1/2013 | Pacheco-Sanchez | G06F 11/3447 709/224 |
| 2013/0148525 | A1* | 6/2013 | Cuadra Sanchez | H04L 41/147 370/252 |
| 2013/0219048 | A1* | 8/2013 | Arvidsson | H04L 41/5025 709/224 |
| 2014/0019634 | A1* | 1/2014 | Srinivasan | H04L 65/80 709/231 |
| 2014/0122594 | A1* | 5/2014 | Uzunalioglu | H04L 67/22 709/204 |
| 2014/0160941 | A1* | 6/2014 | Hui | H04W 24/10 370/241 |
| 2014/0185474 | A1* | 7/2014 | Martins | H04L 41/5009 370/252 |
| 2014/0243012 | A1* | 8/2014 | Wirola | G01S 5/0263 455/456.1 |
| 2015/0067184 | A1* | 3/2015 | Parthasarathy | H04L 65/60 709/231 |
| 2015/0142702 | A1* | 5/2015 | Nilsson | G06N 5/048 706/11 |
| 2015/0304737 | A1* | 10/2015 | Franklin | H04N 21/44222 725/14 |
| 2015/0326447 | A1* | 11/2015 | Yoon | H04L 41/5025 709/224 |
| 2015/0341594 | A1* | 11/2015 | Ma | H04N 19/172 348/14.02 |
| 2015/0365839 | A1* | 12/2015 | Beerends | H04W 24/08 370/252 |
| 2015/0373565 | A1* | 12/2015 | Safavi | H04L 41/147 370/252 |
| 2016/0065419 | A1* | 3/2016 | Szilagyi | H04L 41/5067 709/224 |
| 2016/0112732 | A1* | 4/2016 | Li | H04L 65/605 725/116 |
| 2016/0112894 | A1* | 4/2016 | Lau | H04W 24/10 370/252 |
| 2016/0135104 | A1* | 5/2016 | Lau | H04W 36/0083 455/436 |
| 2016/0248835 | A1* | 8/2016 | Petrangeli | H04L 65/608 |
| 2016/0286427 | A1* | 9/2016 | Chakraborty | G06F 9/3836 |
| 2017/0019454 | A1* | 1/2017 | Almohamedh | H04L 65/80 |
| 2017/0078171 | A1* | 3/2017 | Tapia | H04L 43/08 |
| 2017/0085617 | A1* | 3/2017 | Bovik | H04L 65/80 |
| 2017/0186019 | A1* | 6/2017 | Loeb | G07F 17/3227 |
| 2017/0215094 | A1* | 7/2017 | Akoum | H04W 24/08 |
| 2017/0366398 | A1* | 12/2017 | Mizrachi | H04L 41/0816 |
| 2018/0005247 | A1* | 1/2018 | Loeb | G06Q 30/016 |

OTHER PUBLICATIONS

A. Sackl et al., "Got what you want? Modeling expectations to enhance web QoE prediction," 2014 Sixth International Workshop on Quality of Multimedia Experience, Singapore, 2014, pp. 57-58. [retrieved on Jun. 21, 2019]. <URL: https://ieeexplore.ieee.org/document/6603240>. (Year: 2014).*

A. Rehman et al., "Perceptual experience of time-varying video quality," 2013 Fifth International Workshop on Quality of Multimedia Experience (QoMEX), Klagenfurt am Worthersee, 2013, pp. 218-223. [retrieved on Jun. 21, 2019]. <URL: https://ieeexplore.ieee.org/document/6603240>. (Year: 2013).*

Y. Shen et al., "QoE-based evaluation model on video streaming service quality," 2012 IEEE Globecom Workshops, Anaheim, CA, 2012, pp. 1314-1318. [retrieved on Jun. 21, 2019]. <URL: https://ieeexplore.ieee.org/document/6477772>. (Year: 2012).*

T. Yamazaki et al., "A service quality coordination model bridging QoS and QoE," 2012 IEEE 20th International Workshop on Quality of Service, Coimbra, 2012, pp. 1-4. [retrieved on Jun. 21, 2019]. <URL: https://ieeexplore.ieee.org/document/6245977>. (Year: 2012).*

S. Aroussi et al., "Survey on machine learning-based QoE-QoS correlation models," 2014 International Conference on Computing, Management and Telecommunications (ComManTel), Da Nang, 2014, pp. 200-204. [retrieved on Jun. 21, 2019]. <URL: https://ieeexplore.ieee.org/document/6825604>. (Year: 2014).*

* cited by examiner

APPLICATION QUALITY OF EXPERIENCE EVALUATOR FOR ENHANCING SUBJECTIVE QUALITY OF EXPERIENCE

BACKGROUND

Development of long term evolution (LTE) connectivity together with an increase in smart phone usage has enabled users to remain connected in a "virtual space." Applications running on smart phones have contributed to this state, by providing a richer content for users, such as real-time video, e-mail, instant messaging, etc. As usage increases and network resources become constrained, it becomes desirable to evaluate quality of experience of applications in LTE networks from a user perspective. However, conventional approaches fail to effectively evaluate service quality and quality of experience from mobile application and user satisfaction perspectives.

DETAILED DESCRIPTION OF THE PREFERRED EMBODIMENTS

Figure 1A:
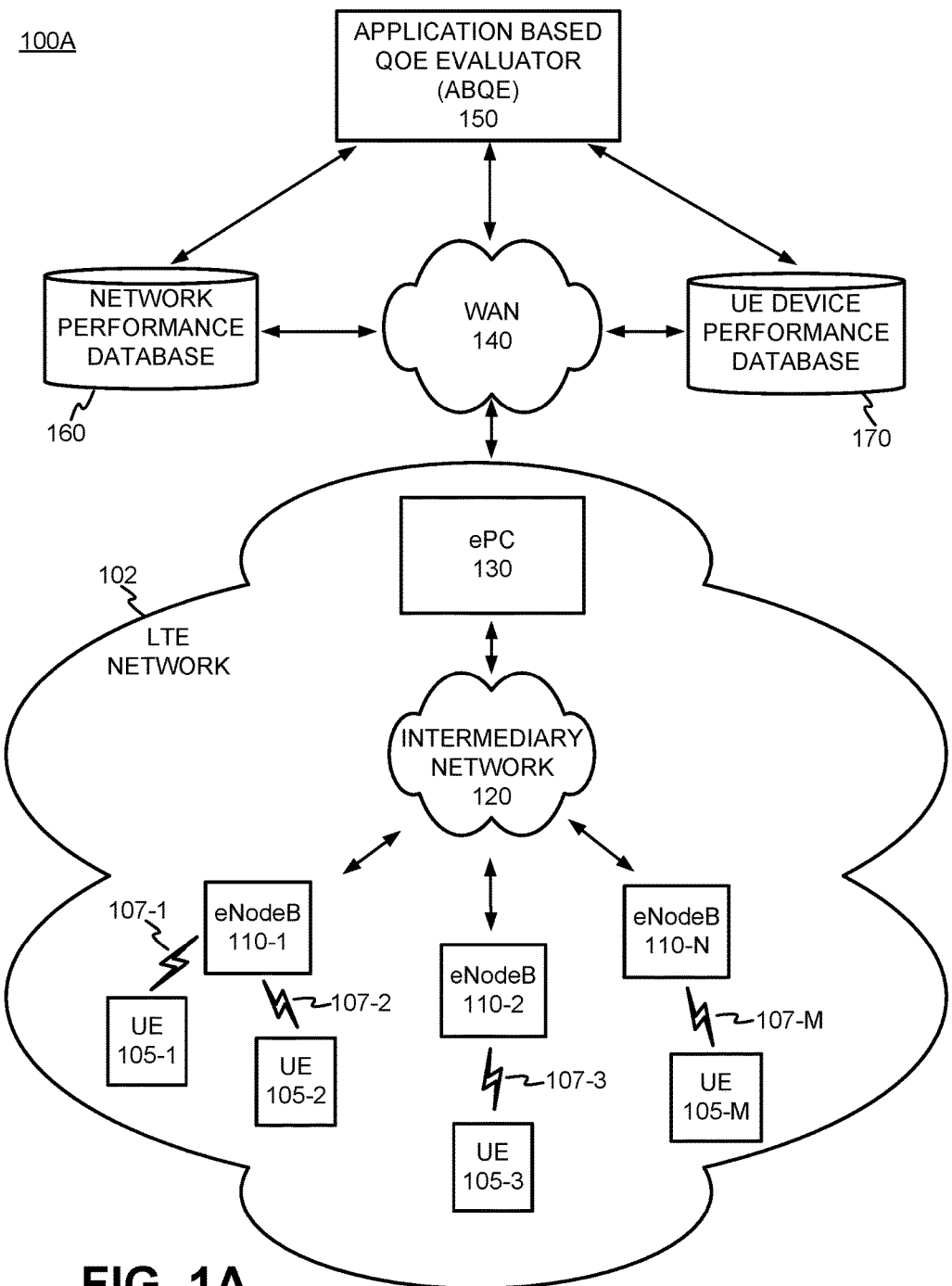
FIG. 1A is a block diagram illustrating an exemplary network environment which can be evaluated and managed using perception based models.

The following detailed description refers to the accompanying drawings. The same reference numbers in different drawings may identify the same or similar elements. The following detailed description does not limit the invention.

Embodiments described herein are directed to approaches for enhancing a subjective quality of experience (QoE) for wireless applications. As used herein, a wireless application may include software applications, such as, for example, web browsers, music and/or video players, social networking platforms, email clients, etc., which may execute (in whole or in-part) on a user equipment device (hereinafter "UE") under the control of a user. The wireless application may utilize the wireless communications capability of the UE to exchange data with various network devices (e.g., servers, other UEs, etc.) over a wireless network.

Given that users interact with, and derive value from, applications residing on mobile devices, it may be desirable to evaluate and/or adjust network performance based on the QoE for various mobile applications. A methodology is provided herein for a quantitative understanding as to how adjustments of various parameters within the communications network improves the QoE for the user. Given the complexity of the network, the methodology should consider successive layers of the network, from general infrastructure to customers, such as, for example the physical devices in the network, raw radio frequency (RF) indicators, traffic indicators, signaling indicators, objective perceived performance, and subjective user perception.

Accordingly, embodiments presented herein may determine how network performance impacts the subjective perception on application and network performance as perceived by the user (e.g., QoE). Embodiments may evaluate and improve application and network performance over various sized regions in the LTE network, from portions of the network associated with the evolved Packet Core (ePC), to micro regions of LTE network, which may include individual cells associated with a base station, and so-called micro cells and/or nano cells.

Various embodiments may use two different types of models to relate network performance and subjective application quality of experience. The first model, defined herein as a perception model, may relate observable application characteristics (which are also referred to herein as "application quality of experience indicators" (APIs)) to various measureable network performance parameters (which are also referred to as "network key performance indicators" (NKPIs) and device key performance indicators (DKPIs)). The NKPIs may include radio frequency KPI (RFKPIs) and network time delay key performance indicators (NTDKPIs). The DKPIs may include, for example, user equipment (UE) logs containing processor timing, user interface delays, etc. The second model, defined herein as a QoE model, relates a subjective user satisfaction score to the aforementioned observable application characteristics (i.e., the APIs). The QoE model may be derived from subjective QoE survey data that may be collected by individual UEs and stored in the UE logs described above. Details of the perception models and the QoE model are described in relation to FIG. 3A through FIG. 5.

FIG. 1A is a block diagram illustrating an exemplary network environment 100A which can be evaluated and managed using perception based models. In an embodiment, the network environment 100A may include a long term evolution (LTE) network 102 which further includes: User Equipment (UE) 105 (as used herein, plurally referred to as "UE 105" and individually as "UE 105-x", wherein x=1, . . . , M), evolved Node Bs (eNodeBs) 110 (plurally referred to as "eNodeBs 110" and individually as "eNodeB 110-x", wherein x=1, . . . , M), an intermediary network 120, and an evolved Packet Core (ePC) 130. Network environment 100A may further include a Wide Area Network 140, an application based QoE evaluator (ABQE) 150, a network performance database 160, and a UE device performance database 170. For ease of explanation, only a limited number of network elements are shown in network environment 100A depicted in FIG. 1A. However, it should be understood that a greater number of network elements may be part of network environment 100A, including other types of known network entities not illustrated in FIG. 1A. Other embodiments may include additional or different network entities in alternative configurations than which are exemplified in FIG. 1A. Additionally, embodiments described herein may be presented within the context of the Long Term Evolution (LTE) wireless standard for ease of explanation. However, aspects of the invention are not restricted to the LTE standard, and may be applied to other networking standards, such as, for example, LTE Advanced, Global System for Mobile Communications (GSM), Universal Mobile Telecommunications System (UMTS), IS-2000, etc.

UEs 105 may communicate with infrastructure network 102 through eNodeB 110 over a wireless channel 107 (collectively referred to as "wireless channel 107" and individually as "wireless channel 107-x"). LTE network 102 may exchange application data flows (ADFs) between two or more UEs 105, and/or with one or more network devices (not shown), through one or more eNodeBs 110. Each eNodeB 110 may interface with the ePC 130 through an intermediary network 120. According to an embodiment, one or more eNodeBs 110, which may be functionally interconnected to each other and can also be separately connected to intermediary network 120, may be referred to as the evolved UMTS Terrestrial Radio Access Network (eUTRAN). In other embodiments using different wireless standards, the eNodeBs 110 may be referred to as base stations and the eUTRAN referred to simply as a Radio Access Network (RAN). The intermediary network 120 may interface to ePC 130 which handles the ADFs over user plane traffic (e.g., Access Stratum functionality), and perform control operations for eNodeBs 110 and UEs 105 based at least in part on control plane signals (e.g., Non-Access Stratum functionality). While not shown for simplicity, more than one ePC 130 may be included in LTE network 102 and may communicate with each other. Additionally, ePC 130 may exchange ADFs with other network devices through a WAN 140. WAN 140 may include a plurality of networks which can span large areas, thus permitting UEs 105 to communicate over practically any geographical distance.

ABQE 150 may communicate with network elements throughout LTE network 102 through WAN 140, and/or communicate directly with network performance database 160 and UE device performance database 170. By adjusting parameters in LTE network 102 based upon the network evaluation, ABQE 150 may improve subjective application quality of experience for UEs 105 communicating within the cells managed by eNodeBs 110, and/or with other regions of LTE network 102, such as ePC 130 and/or intermediary network 120. ABQE 150 may include any type of networking device which may receive data relating to network performance, device performance, and/or user survey data, generate models to analyze and evaluate how network performance impacts the subjective application quality of experience as perceived by the user (e.g., QoE). For example, ABQE 150 may be implemented as a general processor-based system executing software (e.g., a server or other network element), or embodied using dedicated hardware (e.g., application specific integrated circuits (ASICs), field programmable gate arrays (FPGAs), etc.), or as a combination thereof. Details of an embodiment of ABQE 150 are discussed below in reference to FIG. 6.

Network performance database 160 may receive traffic measurements to derive various NKPIs for LTE network 102, and/or obtain measurements from infrastructure network devices within LTE network 102. Such NKPIs may include RFKPIs associated with wireless channel 107 and/or NDTKPIs incurred throughout LTE network 102. Data stored within network performance database 160 may be obtained directly from network elements within LTE network 102, from sensors positioned throughout LTE network 102 and/or derived from traffic measurements flowing throughout LTE network 102. While FIG. 1A only shows one network performance database 160, multiple databases 160 may exist, and may be connected though WAN 140 and/or directly connected with elements in LTE network 102, that may be used by ABQE 150 for network evaluation, management, tuning, and/or optimization.

UE device performance database 170 may receive traffic measurements to derive various DKPIs for UEs 105 within LTE network 102, and/or obtain measurements from devices within LTE network 102. Such DKPIs may include performance parameters associated with hardware elements within UEs 105 (e.g., processor speed, user interface latencies). DKPIs may also include data describing user selections which may provide a measure of QoE, such as, for example, subjective QoE survey data which may be used to derive QoE models, as described in more detail in reference to FIG. 5. Data stored within UE device performance database 170 may be obtained from existing UEs' 105 diagnostic capabilities and/or derived from traffic measurements. While FIG. 1A only shows one UE device performance database 170, multiple databases 170 may exist, and may be connected though WAN 140 and/or directly connected with network elements in LTE network 102.

Further referring to FIG. 1A, intermediary network 120 may be any type network which supports one or more eNodeBs 110 for interfacing with ePC 130. Intermediary network 120 may include Cell Site Routers (CSRs), Extended Back Haul (EBH) network(s), optical networks which include wavelength division multiplexed (WDM) optical components, multiservice provisioning platforms (MSPPs), metro-Ethernet networks, etc.

EPC 130 may be a core networking infrastructure that provides mobility management, session management, authentication, and packet transport to support UEs 105 and eNodeBs 110 for wireless communication, and further provide wireless networking elements access to WAN 140. EPC 130 may be compatible with known wireless standards which may include, for example, LTE, LTE Advanced, Global System for Mobile Communications (GSM), Universal Mobile Telecommunications System (UMTS), IS-2000, etc.

ENodeB 110-x may be any type of base station that can be included within any type of radio access network, and can be compatible with known wireless standards. Such standards may include, for example, LTE, LTE Advanced, GSM, UMTS, IS-2000, etc. In some embodiments, eNodeB-i 110 may be a wireless access point which can service any type of WiFi standard (e.g., any IEEE 801.11x network, where x=a, b, c, g, and/or n), and/or include any other type of wireless network technology for covering larger areas, and may include a mesh network (e.g., IEEE 801.11s) and/or or a WiMAX IEEE 802.16.

UE 105-x may include any type of mobile device having communication capabilities, and thus communicate with eNodeB 110-x using a variety of different wireless channels. In some embodiments, the mobile device may communicate with network environment 100A using a wired connection. Thus UE 105-x may be a mobile device that may include, for example, a cellular radiotelephone, a smart phone, a tablet, a wearable computer (e.g., wristwatch, eyeglasses, etc.), a set-top box (STB), a mobile phone, any type of IP communications device, a Voice over Internet Protocol (VoIP) device, a laptop computer, a palmtop computer, a gaming device, a media player device, or a digital camera that includes communication capabilities (e.g., wireless communication mechanisms). In various embodiments, the wireless channel 107 may be supported by any cellular radio access network (RAN), such as, for example, an LTE eUTRAN. In other embodiments, the wireless channel 107 may be supported by a local or wide area wireless network. A local area wireless network may include any type of WiFi (e.g., any IEEE 801.11x network, where x=a, b, c, g, and/or n). A wide area wireless network may include any type of wireless network covering larger areas, and may include a mesh network (e.g., IEEE 801.11s) and/or or a WiMAX IEEE 802.16.

WAN 140 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Figure 1B:
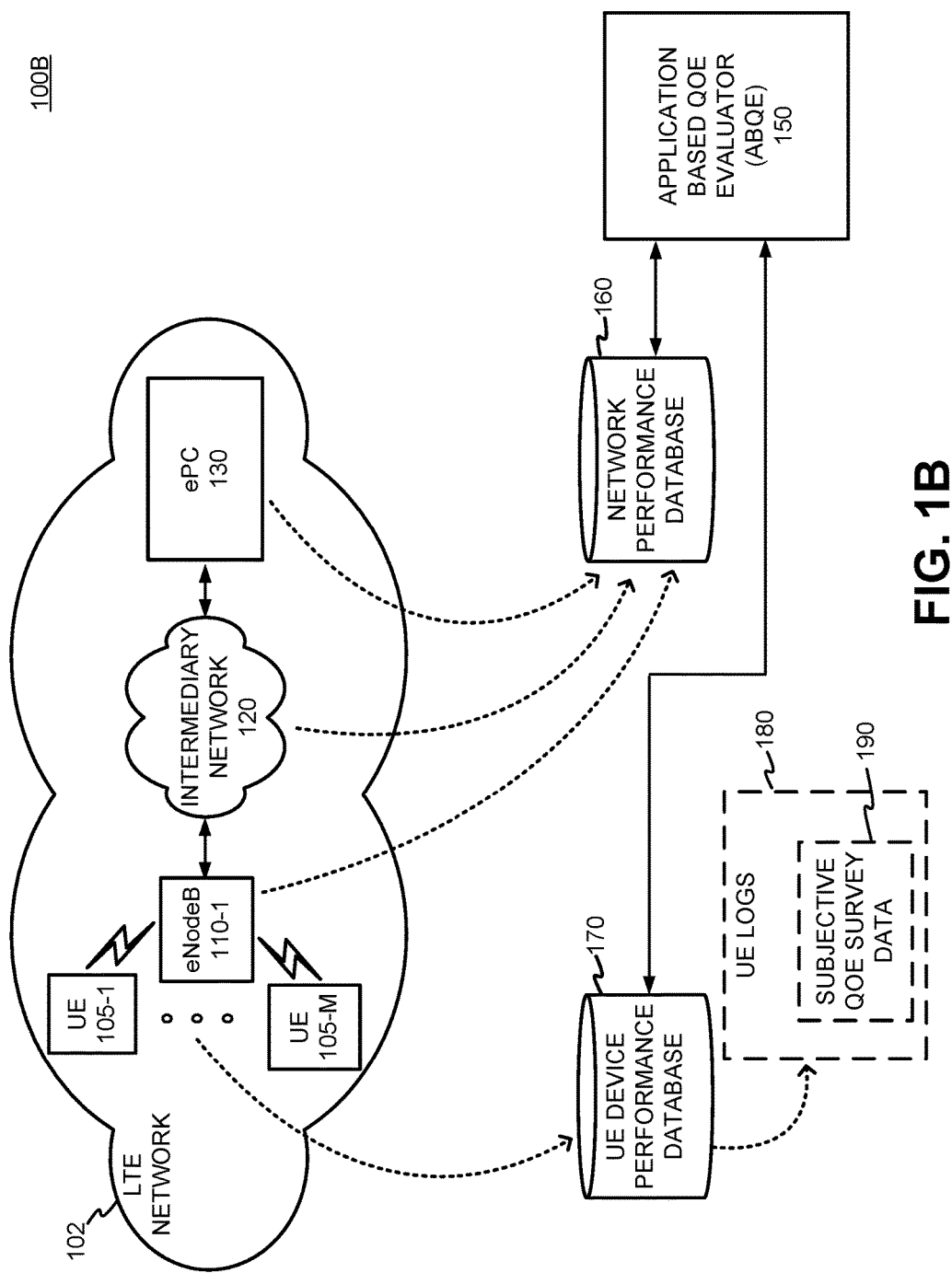
FIG. 1B is a block diagram depicting exemplary details of data transfers associated with network environment 100A shown in FIG. 1A.

FIG. 1B is a block diagram depicting exemplary details of data transfers associated with network elements 100B which are included in the network environment 100A shown in FIG. 1A, and includes UEs 105, eNodeB 110-1, intermediary network 120, ePC 130. FIG. 1B illustrates that ABQE 150 may utilize a number of datasets collected from different elements within LTE network 102 to evaluate and/or adjust network performance based on user QoE for various mobile applications.

The datasets may be collected in different databases for subsequent use by ABQE 150. Such databases may include UE device performance database 170 and network performance database 160, either of which may be distributed databases having various interfaces with LTE network 102 and/or ABQE 150. For example, UE device performance database 170 and/or network performance database 160 may directly interface with ABQE 105 (as shown in FIG. 1B) and/or may interface with ABQE 150 through WAN 140 (not shown in FIG. 1B). Similarly, UE device performance database 170 and/or network performance database 160 may interface with LTE network 102 through WAN 140 as shown in FIG. 1A, and/or may have multiple interfaces within LTE network 102 with network elements residing therein (not shown). For simplicity, the combinations of structural interfaces between various databases shown in FIG. 1B and LTE network 102 are not shown. However, dotted lines are used in FIG. 1B to illustrate exemplary data flows from LTE network 102 to various databases shown in FIG. 1B.

In an embodiment, ABQE 150 may exchange data with network performance database 160 and UE device performance database 170 so that ABQE 150 may generate one or more perception models. The perception models relate application quality of experience indicators (APIs) (i.e., observable application characteristics) to network key performance indicators (NKPIs) and/or device key performance indicators (DKPIs).

The network performance database 160 may receive network performance information from eNodeB 110-1, from network elements in intermediary network 120, and/or ePC 130. Network performance database 160 may receive the network performance information directly as one or more NKPIs, and/or may receive data from which one or more NKPIs may be derived. For example, network performance database 160 may receive raw traffic data which may be used to generate NKPIs, either by ABQE 150 and/or other intermediary network devices (not shown). Raw traffic data may include throughput measured at a particular network element and/or through segments within LTE network 102 which may include two or more network elements. Raw traffic data may be measured using one or packet trace traps (PTTs) placed within network segments and/or across selected network elements to measure traffic flow (not shown). The NKPIs may include radio frequency KPI (RFKPIs) (e.g., KPIs associated with the air interface 107) and network time delay key performance indicators (NTDKPIs) (e.g., KPIs associated with time delays within and/or between network elements in LTE network 102 and/or WAN 140).

UE device performance database 170 may provide DKPIs to ABQE 150 for generating one or more perception models. DKPIs may be sent by one or more UEs 105, and include various KPIs associated with UEs 105, such as, for example, internal processing speeds and/or latencies. Moreover, UE device performance database 170 may include UE logs 180, which may which include information regarding user interaction with UEs 105. For example, UE logs 180 may include results to subjective QoE survey data 190. QoE survey data 190 may be provided to ABQE 150 for generating the QoE model which relates the subjective user satisfaction scores to the APIs.

For ease of explanation, only a limited number of network elements are shown in the network environment 100B depicted in FIG. 1B. However, it should be understood that a greater number of network elements may be part of network environment 100, including other types of known network entities not illustrated. Other embodiments may include additional or different network entities in alternative configurations than which are exemplified in FIG. 1B.

Figure 2:
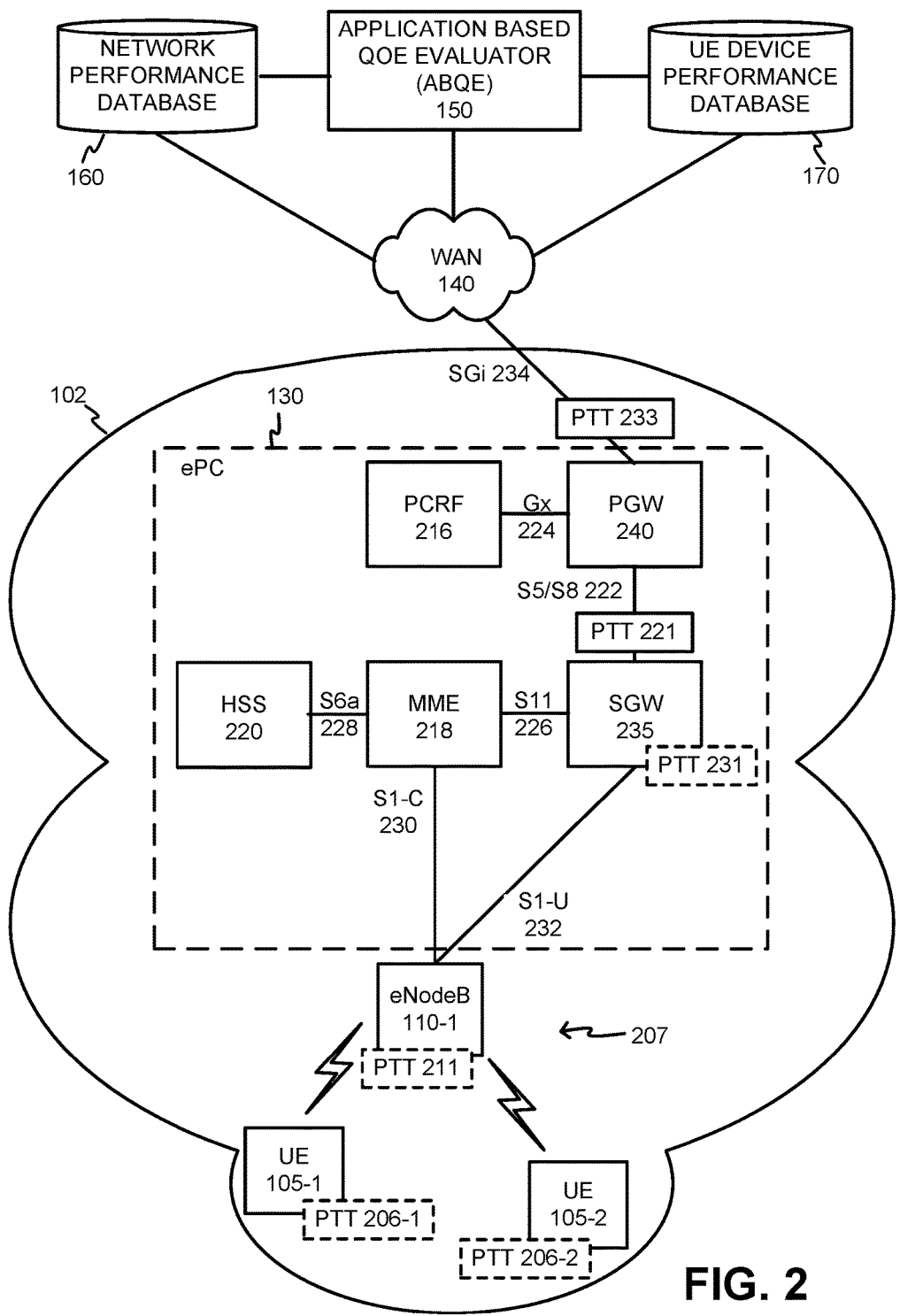
FIG. 2 is a block diagram illustrating exemplary details of an evolved NodeB (eNodeB) in a long term evolution (LTE) wireless network according to an embodiment.

FIG. 2 is a block diagram of network 100A which illustrates exemplary details of ePC 130, and interconnections of various network devices, including UE 105, eNodeB 110-1, ePC 130, WAN 140, ABQE 150, network performance database 160, and UE device performance database 170. EnodeB 110-1 may be part of an evolved Universal Mobile Telecommunications System (UMTS) Terrestrial Radio Access Network (eUTRAN) 207. While the network elements shown in FIG. 2 are presented in the context of an LTE network, it should be appreciated that embodiments presented herein may operate in any appropriate wireless network(s).

LTE network 102 may further include one or more devices that are physical and/or logical entities interconnected via standardized interfaces. LTE network 102 provides wireless packet-switched services and wireless IP connectivity to UEs 105 to provide, for example, data, voice, and/or multimedia services. The ePC 130 may further include a mobility management entity (MME) 218, serving gateway (SGW) device 235, packet data network gateway (PGW) 240, a Policy and Charging Rules Function (PCRF) 216, and a home subscriber server (HSS) 220. It is noted that FIG. 2 depicts a representative LTE network 102 with exemplary components and configuration shown for purposes of explanation. Other embodiments may include additional or different network entities in alternative configurations than which are exemplified in FIG. 2.

Further referring to FIG. 2, each eNodeB 110-1 may include one or more devices and other components having functionality that allow UEs 105 to wirelessly connect to eUTRAN 207. ENodeB 110 may interface with ePC 130 via an S1 interface, which may be split into a control plane S1-C interface 230 and a data plane S1-U interface 232. S1-C interface 230 may interface with MME device 218. S1-C interface 230 may be implemented, for example, with a protocol stack that includes a Network Access Server (NAS) protocol and/or Stream Control Transmission Protocol (SCTP). S1-U interface 232 may interface with SGW 235 and may be implemented, for example, using a General Packet Radio Service Tunneling Protocol version 2 (GTPv2). ENodeB 110-1 may communicate with other eNodeBs via an X2 interface (not shown). The X2 interface may be implemented, for example, with a protocol stack that includes an X2 application protocol and SCTP. Further shown are a number of Packet Trace Traps (PTTs) 206 (collectively referred to as "PTT 206" and individually as "PTT 206-x"), and 211 which may be placed in the eUTRAN 207 for measuring traffic data therein. For example, PTT 206-1 may reside directly in UE 105-1, and PTT 206-2 may be located in UE 105-2 to measure traffic data flowing through the UEs 105. PTT 211 may be located in eNodeB 110-1 to measure traffic data flowing through eNodeB 110-1. Additionally, to measure traffic data flowing through S1-U 332, one or more PPTs 231 may be located therein.

MME device 218 may implement control plane processing for LTE network 102. For example, MME device 218 may implement tracking and paging procedures for UEs 105, may activate and deactivate bearers for UEs 105, may authenticate respective users of UEs 105, and may interface to non-LTE radio access networks. A bearer may represent a logical channel with particular QoS requirements, and can be used in some embodiments to control packet flows as described herein. MME device 218 may also select a particular SGW 235 for a particular UE 105-x. MME device 218 may interface with other MME devices (not shown) in ePC 130 and may send and receive information associated with UEs 105, which may allow one MME device to take over control plane processing of UEs 105 serviced by another MME device, if the other MME device becomes unavailable.

SGW 235 may provide an access point to and from UEs 105, may handle forwarding of data packets for UEs 105, and may act as a local anchor point during handover procedures between eNodeBs 110. SGW 235 may also include internal PTT 231 to measure traffic data flowing through SGW 235. SGW 235 may interface with PGW 240 through an S5/S8 interface 222. S5/S8 interface 222 may be implemented, for example, using GTPv2. Additionally, one or more PTTs 221 may be located in S5/S8 interface to measure traffic data flowing between SGW 235 and PGW 240.

PGW 240 may function as a gateway to WAN 140 through a SGi interface 234. One or more PTTs 233 may be placed in SGi interface 234 to measure traffic data between PGW 240 and WAN 140. WAN 140 may include, for example, an IP Multimedia Subsystem (IMS) network, which may provide voice and multimedia services to UEs 105, based on Session Initiation Protocol (SIP). A particular UE 105-x, while connected to a single SGW 235, may be connected to multiple PGWs 240, one for each packet network with which UE 105-x communicates.

PCRF 216 provides policy control decision and flow based charging control functionalities. PCRF 216 may provide network control regarding service data flow detection, gating, quality of service (QoS) and flow based charging, etc. PCRF 216 may determine how a certain service data flow shall be treated, and may ensure that user plane traffic mapping and treatment is in accordance with a user's subscription profile. PCRF 216 may communicate with PGW 240 using a Gx interface 224. Gx interface 224 may be implemented, for example, using a Diameter protocol. The Gx interface may not have a PTT since it does not transfer traffic data.

MME device 218 may communicate with SGW 235 through an S11 interface 226. S11 interface 226 may be implemented, for example, using GTPv2. S11 interface 226 may be used to create and manage a new session for a particular UE 105. S11 interface 226 may be activated when MME device 218 needs to communicate with SGW 235, such as when the particular UE 105-x attaches to ePC 130, when bearers need to be added or modified for an existing session for the particular UE 105, when a connection to a new PGW 240 needs to created, or during a handover procedure (e.g., when the particular UE 105-x needs to switch to a different SGW 235).

HSS device 220 may store information associated with UEs 105 and/or information associated with users of UEs 105. For example, HSS device 220 may store user profiles that include authentication and access authorization information. MME device 218 may communicate with HSS device 220 through an S6a interface 228. S6a interface 228 may be implemented, for example, using a Diameter protocol.

In an embodiment, ABQE 150 may interface to the ePC 130 through WAN 140 to receive traffic data from the PTTs, and provide adjusted network parameters based on the QoE model and the perception models. The adjusted network parameters may be provided to the appropriate network elements in ePC 130 and/or eUTRAN 207 directly, or through the assistance of a network operator. Additionally, or alternatively, ABQE 150 may receive traffic data through network performance database 160, to determine various NKPIs, and/or receive actual NKPIs. ABQE150 may also receive DKPIs from UE device performance database 170. In an embodiment, ABQE 150 may interface directly with network performance database 160 and/or UE device performance database 170. Additionally, or alternatively, 150 may interface with network performance database 160 and/ or UE device performance database 170 through WAN 140.

Further referring to FIG. 2, multiple elements in ePC 130 perform various functions for implementing QoS and policy management. As noted above, PCRF 216 may be the policy server in ePC 130. PCRF 216 may take the available network information and operator-configured policies to create service session-level policy decisions. The decisions, known as Policy and Charging Control (PCC) rules, are forwarded to a policy and charging enforcement function (PCEF) (not shown) located in PGW 240. The PCEF enforces policy decisions by establishing bearers, mapping service data flows to bearers, and performing traffic policing and shaping. In one example, PGW 240 maps bearers to the underlying transport network. The transport network will typically be Ethernet based, and may use multiprotocol label swithing (MPLS). The transport may not be aware of the bearer concept and will use standard IP QoS techniques, such as DiffServ. ENodeB 110-1 plays a role in end-to-end QoS and policy enforcement, and performs uplink and downlink rate policing, as well as scheduling resource blocks which are transmitted over the wireless channel. EnodeB 110-1 may use Allocation and Retention Policy (ARP) when allocating bearer resources. The effectiveness of resource block scheduling algorithms in eNodeBs 110 can have a significant impact on service quality and overall network performance. UE 105 may also perform functionality which impacts policy in the uplink direction, as it performs the initial mapping of service data flows to bearers.

While FIG. 2 shows exemplary components of LTE network 102, in other implementations, LTE network 102 may include fewer components, different components, differently arranged components, or additional components than depicted in FIG. 2. Additionally, or alternatively, one or more components of LTE network 102 may perform functions described as being performed by one or more other components.

Figure 3A:
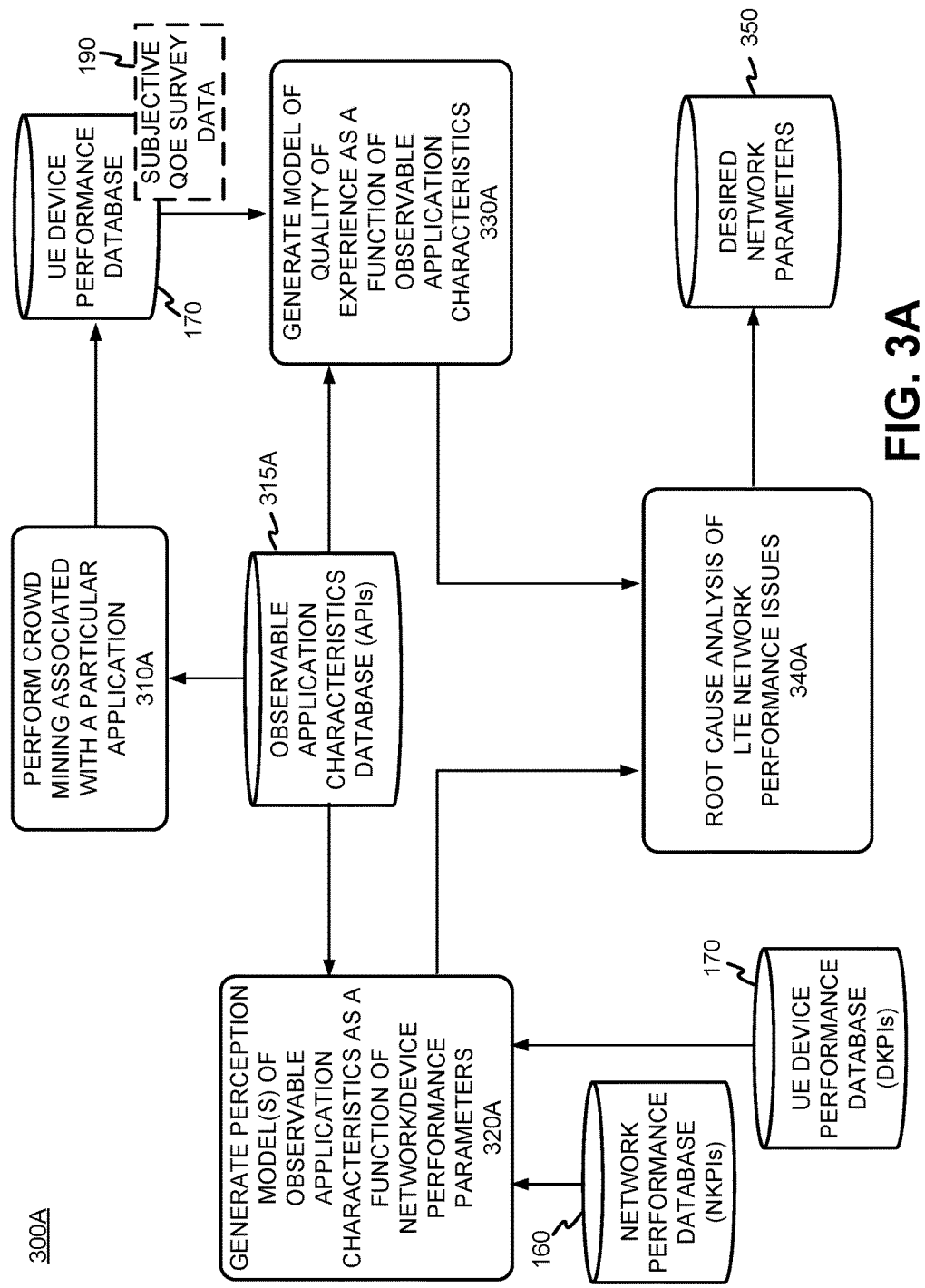
FIG. 3A is a diagram showing exemplary processing flow for generating perception model(s) and quality of experience (QoE) model for any application.

FIG. 3A is a diagram showing exemplary processing flow 300A for generating perception model(s) and QoE model for any mobile (or other) application. In an embodiment, portions of processing flow 300A, such as, for example, Blocks 320A, 330A, and 340A, may be performed in ABQE 150, and Block 310A may be performed in a distributed manner through a plurality of UEs 105.

In Block 310A, crowd mining may be conducted on a plurality of UEs 105 to statistically sample user QoE for a particular application. The crowd mining may take the form of users participating in surveys to determine the preferability of an application while the application is executed with a variety of different observable application characteristics, or in other words, with various combinations of different values for selected APIs. Because the sampled QoE is directly based upon user preference, the APIs selected for a particular application should be chosen so they correlate strongly with the users' perception of variations in the performance of the application under test in the survey. Thus, the APIs should be observable application characteristics selected based on their relationships with user perception for a particular application and are empirically, or historically, known to have a noticeable impact on user satisfaction. For example, when the application under consideration is video player, a parameter characterizing video stuttering during playback would be strongly considered as one API, as it is well known the video stuttering has a strong negative effect on user quality of experience when videos are being played. In another example, as will be discussed below, when the application under consideration is a web browser, the APIs may include latency and data throughput.

Further referring to Block 310A, once the types of APIs are selected based on the type of application under test, a test survey may be designed to select a range of values for the selected APIs to use in the user satisfaction surveys. The test surveys may take the form of side-by-side or sequential (e.g., "pair wise") comparisons of the application being executed with different values for preselected APIs. The test survey may be performed by each user on their UE 105-x, and temporarily stored within the UE logs 180 on each UE 105-x. The selected APIs, as well as their range of values, may be used as inputs for the application under test, and can be stored in observable applications characteristics database 315. The selected API data may be provided to the participating UEs 105 over LTE network 102 during the testing. Results for a particular test survey may be stored in UE 105-x in UE logs 180, which may be collected over a statistically significant number of UEs 105 and cumulatively stored in UE device performance database 170 as subjective QoE survey data 190. Because the number of different APIs and their respective ranges of their respective values may lead to an inordinate number of combinations to test if exhaustive testing were conducted, the actual API values that will be tested may be selected based on known testing design techniques to efficiently conduct the survey to discover which combinations of API values may optimize, or at least improve, the QoE testing for the application being considered. Exemplary details of the testing techniques are provided in the description relating to FIG. 5.

In Block 320A, ABQE 150 may generate perception model(s) of observable application characteristics (e.g., APIs) as a function of (NKPIs) and/or device key performance indicators (DKPIs). To generate the perception model(s), ABQE 150 rely upon NKPI data from network performance database 160, API data from observable application characteristics database 315, and, in some embodiments, UE device performance database 170. For example, ABQE 150 may use statistical estimation techniques (described in detail in relation to FIG. 4) to generate the perception model(s) that mathematically relate selected APIs, which may quantify the observable application characteristics, with various measureable network performance parameters known generally as network key performance indicators (NKPIs) and/or device key performance indicators (DKPIs). The NKPIs may include any type of parameter that may be used to objectively quantify the performance of the LTE network 102, and may include radio frequency KPIs (RFKPIs) (e.g., signal to noise and interference ratio (SINR), modulation coding scheme (MCS), etc.), and network time delay KPIs (NTDKPIs) (e.g., Radio Resource establishment process delay, evolved radio access bearer (eRAB) setup process delay, etc). NKPIs may also include various KPIs describing the performance of infrastructure network elements in LTE network 102, including, for example, eNodeBs 110, network devices in intermediary network 120, and/or network devices in ePC 130. In some embodiments, NKPIs may include network parameters associated with WAN 140 and/or infrastructure network devices residing therein. The DKPIs may include any type of parameter that may be used to objectively quantify the performance of UEs 105, and may include performance parameters associated with hardware elements within UEs 105 (e.g., processor speed, user interface latencies). DKPIs may be provided in UE logs 180, which may further include data describing user selections that may provide a measure of QoE, such as, for example, subjective QoE survey data 190, which may be used to derive QoE models as discussed in more detail below. The types of APIs of interest for a particular application, and their relevant ranges, may be obtained from observable application characteristics database 315. When developing the perception model for a particular application, the types of APIs and the values used in the crowd mining performed in Block 310A may be included in the generation of the perception model(s) to improve accuracy and relevancy of the perception model(s).

In more detail, the perception model(s) may be represented by the following equation which relates APIs with measure network performance indicators (NKPIs) and/or device performance indicators (DKPIs):

$$API_i = f_i(NKPI_{1,i}, \ldots, NKPI_{Ni,i}, DKPI_{1,i}, \ldots, DKPI_{Pi,i}),$$

where i=1, ... M, M is the total number of application quality of experience indicators, Ni is the total number of NKPIs associated with the $i^{th}$ application quality of experience indicator ($API_i$), and Pi is the total number of DKPIs associated with the $i^{th}$ application quality of experience indicator ($API_i$). The observable application characteristics ($API_{1, \ldots, M}$) may be feature(s) that are selected based on their relationships with user perception for a particular application. Thus, the APIs may vary depending upon the specific application, and be based on observable characteristics that have a strong impact on user satisfaction. For example, when the application under consideration is a web browser used in a web browsing service, the APIs may include latency (e.g., delays incurring in receiving a response after a request via a hyperlink time delays) and data throughput (e.g., the number of bits per second being exchanged over the hypertext transmit protocol). The perception models for different observable application characteristics may use different models (e.g., when linear regression techniques are used, $API_i$ may have different normal equations than $API_j$ when solving for the regression coefficients), and the generation of the functional model in various embodiments involves specifying coefficients for each of the functions $f_i$. The form of each of the functions $f_i$ may be preselected based upon functions found to best minimize the errors. Moreover, different techniques may be used to determine each model for different observable application characteristics (e.g., $API_i$ may use linear regression, where $API_j$ may use ridge regression). Depending upon how the models are generated, different observable application characteristics (e.g., $API_i$ and $API_j$) may share some or all of the same network key performance indicators as independent variables ($NKPI_{k,i}$ and $NKPI_{k,j}$ may be the same variable), or may have completely different NKPIs as independent variables. Additionally, models for different observable application characteristics (e.g., $API_i$ and $API_j$) may have the same (Ni=Nj) or a different number (Ni≠Nj) of NKPIs as independent variables. The equations describing the perception models $f_i$ may be formalized into equations using machine learning algorithms based on regression techniques, which is discussed in more detail in relation to FIG. 4. The generated preemption model(s) produced in Block 320A may be provided to Block 340A to analyze and tune network performance for the desired application, as will be discussed in more detail below.

In Block 330A, ABQE 150 may generate a QoE model for a particular application of as a function of the observable application characteristics (e.g., APIs). To generate the QoE model, ABQE 150 may rely upon the subjective QoE survey data 190 from UE device performance database 170, and API data from observable application characteristics database 315 relevant to subject QoE survey data 190. In some embodiments, the types of APIs and the relevant values used in the crowd mining performed in Block 310A may also be stored in QoE survey data 190, so input directly from observable application characteristics database 315 may not be required. The QoE model may relate the user satisfaction with a particular application/service with the observable application characteristics (e.g., APIs), and be represented by the following equation:

$$QoE_{app} = g(API_1, \ldots, API_M)$$

where M is the total number of application quality of experience indicators. $QoE_{app}$ is a subjective quality of experience value associated with a particular application (e.g., web browsing). $API_1, \ldots, API_M$ are the observable application characteristics used above in the perception model(s) generated in Block 320A. The $QoE_{app}$ be determined based on statistical methods using subjective QoE survey data. The statistical methods may map the subjective "binary" QoE survey data into a continuous function relating QoE on an arbitrary scale (e.g., from 0 to 5, where 5 represents the highest user satisfaction). In alternative embodiments, the QoE model may be transformed into other industry standard metrics for better comparisons with other systems. For example, the QoE model may be transformed into a mean opinion score (MOS), which ranges from 0 to 5, to better compare with traditional telecommunications services. Details of how ABQE 150 generates the QoE model in Block 330A are described in relation to FIG. 5. ABQE 150 may provide the generated QoE model to Block 340A to analyze and tune network performance for the desired application, as will be discussed in more detail below.

In Block 340A, the ABQE 150 may use the perception model(s) generated in Block 320A and the QoE model generated in Block 330A to perform root cause analysis of LTE network 102 issues on a per application basis, and optimize or at least improve network performance for one or more selected applications executed on UEs 150. The root cause analysis may include inverting the QoE model to determine the range of values for the APIs that best improve the users' quality of experience for a particular application. Once the range of APIs values are determined, perception model(s) may be inverted to determine which combinations NKPIs and/or DKPIs best map to the determined range of API values. The values for the NKPIs and/or the DKPIs may be stored in desired network parameters database 350. The NKPIs may be used to tune and/or optimize regions of the network, from large portions of the LTE network 102 down to micro regions in eUTRAN 207 (e.g., microcells, nanocells, etc.).

Figure 3B:
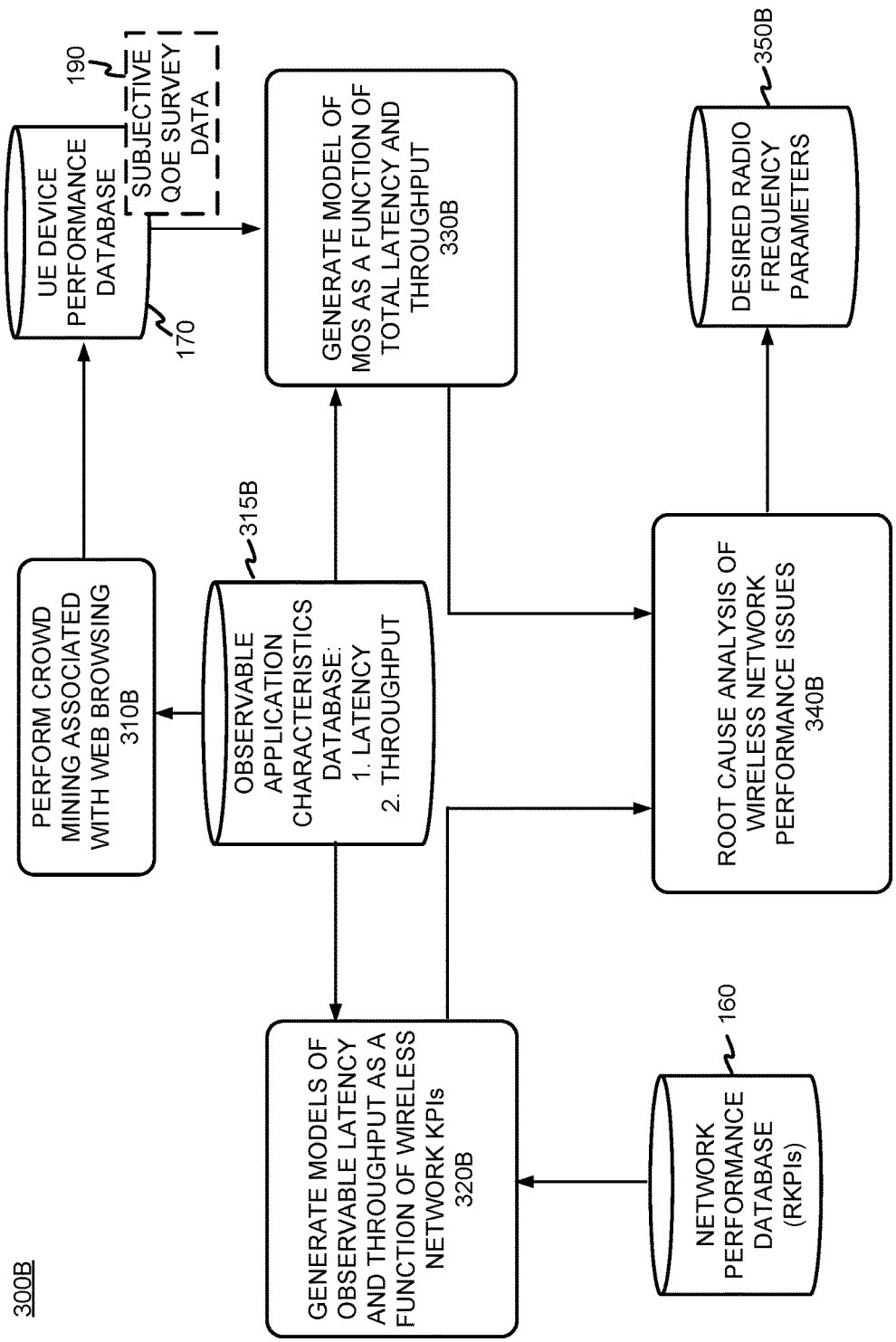
FIG. 3B is a diagram showing exemplary processing flow for generating perception model(s) and QoE model for a web browsing application.

FIG. 3B is a diagram showing exemplary processing flow 300B for generating perception model(s) and a QoE model for a web browsing application. In an embodiment, portions of processing flow 300B, such as, for example, Blocks 320B, 330B, and 340B, may be performed in ABQE 150, and Block 310B may be performed in a distributed manner through a plurality of UEs 105.

In the following example where a web browser is the application of interest, two observable web browsing characteristics may be selected as APIs: 1) throughput, and 2) end-to-end latency. Throughput is the rate of data that is provided thorough the network over the downlink in response to the request. Throughput affects the "size" of pages that may be downloaded, such as, for example, the resolution and dimensions of images and/or videos may be affected by throughput.

The observable latency selected as an API corresponds to the overall delay between a user selecting a hyperlink as a request for data and the result of the request being provided in response to the request. Thus, when a user browses on the web, the LTE network quality perception is reflected in LTE network requests, loading time, from initial action by user on the screen to final visual perception of the web content. While some delays may be attributable to UE 105-x, most perceptible delays are the result of the complex data and messaging exchange process that is invisible to the user, which may take place on the server-side in WAN 140. When users have a negative perception, they tend to only attribute this loss of network quality to an inefficient LTE network 102. However, this negative user perception can be provoked not only by LTE network 102, but to other network elements such as, for example, a domain name server (DNS) server or a web server residing in WAN 140. From a network operator's perspective, an objective is to map the relationships among network performance, user service performance and user perception. Such a model can help LTE network operators to deduce perceived quality, as well as support LTE network analysis. This modeling allows network operators to comprehend the underlying cause when user perception is reduced, by identifying the problematic layer (wireless side, core network side, transmission, DNS service, web server, etc.). Moreover, use of the models may permit the network operator to optimize and/or tune various regions of LTE network 102 to improve network performance.

As an illustrative example, the latency for web browsing may be analyzed from a network perspective in six successive stages, each of which may incur various delays, either before (e.g., UE 105-x initialization) or during the web browsing activity, from a finger touch of a hyperlink on a touch screen display, to the completion of the loaded page being displayed in response to the touching of the hyperlink. Each of the stages is described below, where the various delays are tracked to provide an idea of the source of latency selected as one of the APIs for the web browsing application.

In LTE network 102, the first stage may be the attachment phase. In this phase, a radio resource control (RRC) connection may be initiated. The process continues with the non-access stratum (NAS) security verification. Afterwards, MME 218 and PGW 240 procedures may start. Connection between MME 218 and eNodeB 110-x context may be obtained, which contains establishment of a UE context setup and an eUTRAN 207 radio access bearer (eRAB). After the user boots-up, the second stage may begin, which can be the registration process which typically occurs automatically. In most cases, a user has triggered a page while being at the boot up state. At this point, if UE 105-x is in Idle mode, it may launch a Service Request process. Then, the registration and identification phase may start, which may include the RRC establishment procedure (if the RRC connection has been dropped, the UE 105 may be in the Idle state), the Service Request process, and eRAB procedure. After establishing the RRC access, the UE 105-x context setup, and the eRAB establishment., data transmission may be initiated. However, before a user receives web content upon accessing a hyperlink in the user interface on UE 105-x, three subsequent stages typically are competed. During the third stage, domain name server (DNS) interaction may occur, which includes resolving the user requested universal resource locator (URL) into an Internet protocol (IP) address, which involves processing that includes activity on UE 105-x, eNodeB 110-x, ePC 130, and DNS servers (where the DNS servers may be connected via WAN 140). The fourth stage may involve a transmission control protocol (TCP) three-way handshake to establish the data connection. The fifth stage involves the actual data transmission for fulfilling the web request. In the fifth stage, the web page is downloaded and received at UE 105-x. The sixth stage is the radio resource release phase, which may be performed after completion of transmission of the requested data to the web browser on UE 105-x, which releases the UE context, the eRAB, and the RRC connection. During the process of stages one through six, the second through the fifth stage may have a direct influence on user perception of the web browsing activity using UE 105-x.

Accordingly, the user perception of latency for the web browsing activity may be primarily affected by the following delay components: (1) RRC connection setup delay, (2) Service Request delay, (3) eRAB setup delay, (4) DNS interactive delay, (5) TCP establishment and response time delay, and (6) Service Response delay. The collection of time stamps related to data points may be obtained via the S1-U 232 connection for eNodeB 110-x. Details for each of the six delays are provided below.

The RRC connection setup delay may refer to the delay between RRC_Connection_Request message (UE 105-x to eNodeB 110-x) and RRC_Connection_Setup_Complete message (eNodeB 110-x to UE 105-x). This segment of time also includes the part RRC_Connection_Setup_Request message located in the eNodeB 110-x to UE 105-x segment.

The Service Request delay may correspond to the difference between the RRC_Connection_Setup_Complete message (eNodeB 110-x to UE 105-x) and the Initial_Context_Setup_Request message (MME 218 to eNodeB 110-x). The process of authentication not only includes air interface between UE 105-x and eNodeB 110-x, but also between eNodeB 110-x and the ePC 130. Therefore, this delay may reflect the overall delay of service request with ePC 130 over the air interface.

The eRAB setup delay may be the delay between an Initial_Context_Setup_Request message (MME 218 to eNodeB 110-x) and an Initial_Context_Setup_Response message (eNodeB 110-x to MME 218). This delay may include: reporting and transmission of UE 105-x Radio Capability message, UE 105-x Capability_Info_Indication message, security information exchange, and the RRC attachment and reconfiguration delay. Because the time collection begins from eNodeB 110-x process, the first message for Service_Request is an Initial_Context_Setup_Request message. This delay can only capture the time from MME 218 to eNodeB 110-x, which may be ignored while acquiring data. Among the four time delays described above, only the RRC connection setup delay is attributable to ePC 130 network delay, the others being related to the air interface. Although the eRAB setup process is dedicated to building the ePC 130 network bridge between eNodeB 110-x and MME 218, the actual time delay may mostly be attributable to the air interface because the time collection point is based on data collected over S1-U 232 connection associated with eNodeB 110-x.

The DNS interactive delay occurs when UE 105-x sends a DNS request, find or a response to the WAN 140 attached DNS on service side. The initial message may be sent from UE 105-x as a DNS_Query message. The final message may be a DNS_Query_Response, sent from the DNS to UE 105-x, when there is a request outstanding at the DNS server. Since the time collection begins with eNodeB 110-x, the real delay is the time difference between DNS_Query message (from eNodeB 110-x to UE 105-x) and the DNS_Query_Response message (from the DNS server to eNodeB 110-x). This time difference reflects the delay on ePC 130.

TCP establishment and response time delay may include TCP12 and TCP23 handshake time delays. TCP12 handshake time delay describes a time difference between synchronize request (SYN) (from UE 105-x to web page Service Provided on the service side) and synchronize acknowledgment (SYN ACK). Because this time period begins at eNodeB 110-x, the related delay may be produced between eNodeB 110-x and the Service Provider, the latter delay belonging to ePC 130 network time delay. TCP23 handshake time delay describes a time difference between SYN ACK (from web page Service Provider server side to UE 105-x) to ACK (from UE 105-x to web page Service Provider server). This duration may also be collected on eNodeB 110-x, but may be produced between UE 105-x to eNodeB 110-x, which attributes the delay to the air interface. In general, TCP12 handshake represents the TCP establishment and response process and is attributable to ePC 130 time delay. On the contrary, TCP23 handshake corresponds to TCP response and confirmation process, associated with to air interface time delay.

Service response delay describes a time difference between the first Get process and the first Response process (from UE 105-x to web page Service Provider (SP) on the server side). Since the time collection period begins on eNodeB 110-x, the first GET process time from UE 105-x to SP server may be equal to the time from UE 105-x to eNodeB 110-x. An SP web page server may return the first response process time, from SP server to eNodeB 110-x. Therefore, server response time delay is attributable to ePC 130 network delay.

Accordingly, the API latency may be attributable to the RRC connection establishment delay, the service request delay, the eRAB establishment delay, the DNS interactive delay, the TCP setup and response delay, and the TCP response and confirmation delay, and the service response delay.

Referring back to FIG. 3B, In Block 310B, crowd mining may be conducted on a plurality of UEs 105 to statistically sample user QoE for a web browsing application. The crowd mining may take the form of users participating in surveys as to the preferability of a web browser upon execution with a variety of selected APIs, in this case, latency and throughput. A test survey may be designed to test the web browser using a combination of values corresponding to different combinations of values for latency and throughput. Once ranges of values are selected for latency and throughput, test surveys of users interacting with a web browser may be performed, with users making side-by-side or sequential comparisons of browsing web pages using different combinations of latency and throughput. The test survey may be performed by each user on their UE 105-$x$, and the results are temporarily stored within the UE logs on each UE 105-$x$. The identification of the used APIs as being latency and throughput, as well the combinations of values tested used as inputs for the web browser during the test, are stored in observable applications characteristics database 315B. The stored latency and throughput data may be provided to the participating UEs 105 over LTE network 102. Results for a particular test survey may be stored in UE 105-$x$ in UE logs 180, which may be collected over a statistically significant number of UEs 105 and cumulatively stored in UE device performance database 170 as subjective QoE survey data 190. Because the number of different combinations of latency and throughput values may lead to an inordinate number of combinations to test if exhaustive testing were conducted, the actual latency and throughput values to be tested may be selected based on known testing design techniques to discover which combinations of latency and throughput values may provide the best results for the QoE testing of the web browsing application.

In Block 320B, ABQE 150 may generate perception models of latency and throughput as a function of NKPIs, where in this example, the NKPIs are restricted to selected RFKPIs. To generate the perception models, ABQE 150 may rely upon RFKPI data from network performance database 160, and latency and throughput data from observable application characteristics database 315B. Specifically, ABQE 150 may use statistical estimation techniques (described in detail in relation to FIG. 4) to generate perception model(s) that mathematically relate latency and throughput with RFKPIs. Details about the selected RFKPIs are provided below.

In this example, the performance models of latency and throughput may focus specifically on relationships between LTE network 102 RF performance and service performance in micro regions (e.g., within specific cells associated with eNodeBs 110). The RFKPIs may be selected based on those related to service performance. Accordingly, the RFKPI selection may be based on relevant parameters which affect web page service performance. Since web browsing provides more data on the downlink channel, wireless performance parameters for scheduling radio resources on the downlink channel may be emphasized in the selection of the RFKPIs. Such wireless performance indicators that may be used as RFKPIs to predict web browsing performance may include: reference signal received power (RSRP), reference signal received quality (RSRQ), signal to noise and interference ratio (SINR), channel quality indication (CQI), modulation and coding scheme (MCS), physical downlink shared channel physical resource block (PDSCH_PRB), and physical uplink shared channel physical resource block (PUSCH_PRB).

Accordingly, in Block 320B, the perception models of latency and throughput generated by ABQE 150 may be represented by the following equations:

$$\text{Latency}=f_1(\text{RSRP,RSRQ,SINR,CQI,MCS,PDSCH\_PRB,PUSCH\_PRB}),$$

$$\text{Throughput}=f_2(\text{RSRP,RSRQ,SINR,CQI,MCS,PDSCH\_PRB,PUSCH\_PRB}).$$

It should be noted that the independent variables in above perception models for latency and throughput are merely exemplary candidates, and other models using different and/or additional independent variables may be used in other embodiments. ABQE 150 may generate coefficients for models mathematically characterized by functions $f_1$ and $f_2$ using data from network performance database 160 and observable application characteristics database 315B. Network performance database 160 stores data associated with the RFKPIs listed above, and observable application characteristics database 315B stores data values of latency and throughput. The coefficients for equations $f_1$ and $f_2$ may be determined using machine learning algorithms based on regression techniques, which is discussed in more detail in relation to FIG. 4. The models for latency and throughput ($f_1$ and $f_2$) produced in Block 320B may be provided to Block 340B to analyze and tune network performance for the desired application.

In Block 330B, ABQE 150 may generate a QoE model for web browsing as a function of the observable application characteristics latency and throughput. To generate the QoE model, ABQE 150 rely upon the subjective QoE survey data 190 from UE device performance database 170, and latency and throughput data from observable application characteristics database 315B relevant to subjective QoE survey data 190. The QoE model may relate the user satisfaction with a web browsing application/service with the observable application characteristics of latency and throughput. The QoE model for web browsing may be mathematically represented by the following equation:

$$\text{QoE}_{web}=g(\text{latency, throughput}).$$

$\text{QoE}_{web}$ be determined based on statistical methods using subjective QoE survey data. The statistical methods may map the subjective "binary" QoE survey data into a continuous function g relating QoE on an arbitrary scale (e.g., from 0 to 1, where 1 represents the highest user satisfaction). In alternative embodiments, the QoE model may be transformed into other industry standard metrics for better comparisons with other systems. For example, the QoE model may be transformed into a mean opinion score (MOS), which ranges from 0 to 5, to better compare with traditional telecommunications services. Details of how ABQE 150 generates the QoE model in Block 330B are described in relation to FIG. 5. ABQE 150 may provide the generated QoE model to Block 340B to analyze and tune network performance for the desired application, as will be discussed in more detail below.

In Block 340B, the ABQE 150 may use the perception model(s) generated in Block 320B and the QoE model generated in Block 330B to perform root cause analysis of LTE network 102 issues associated with web browsing, and optimize or at least improve network performance for web browsing applications executed on UEs 150. The root cause analysis may include inverting the $\text{QoE}_{web}$ model to determine the range of throughput and latency values that best improve the users' quality of experience for web browsing. Once the range of latency and throughput values are determined, the perception models for latency and throughput provided above may be inverted to determine which combinations of RFKPIs (RSRP, RSRQ, SINR, CQI, MCS, PDSCH_PRB, and PUSCH_PRB) best map to the determined range of desired latency and throughput values. The values for the RFKPIs may be stored in desired radio frequency parameters database 350. The desired RFKPIs may be used to tune and/or optimize micro regions of the LTE network 102.

Figure 4:
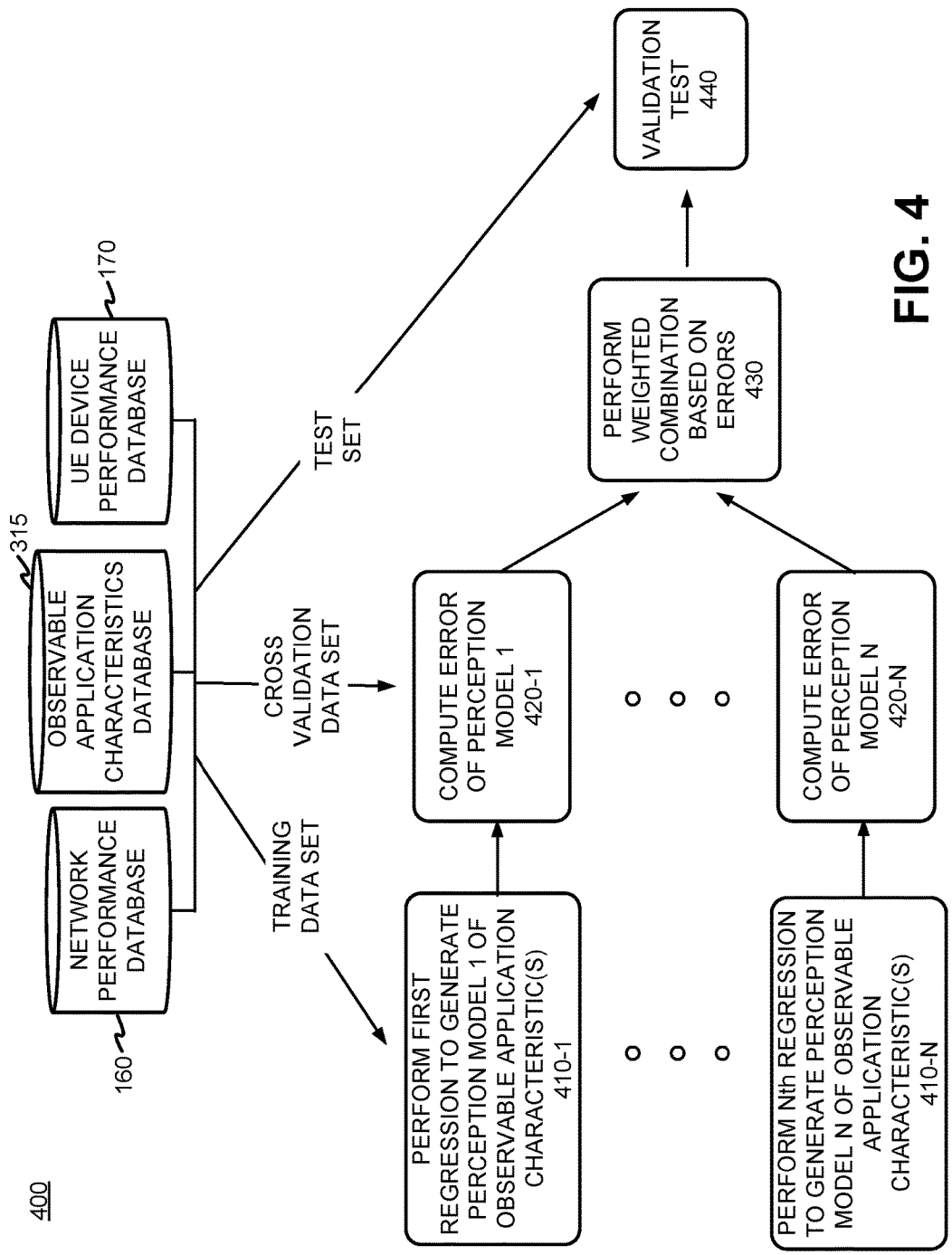
FIG. 4 is a diagram illustrating an exemplary processing flow for determining perception models using machine learning techniques.

FIG. 4 is a diagram illustrating an exemplary processing flow 400 for determining perception model(s) using machine learning techniques. Specifically, processing flow 400 determines the perception model(s) based on an algorithm known as ensemble learning. From historical data, ABQE 150 may determine the perception model(s) from a number of different regression algorithms. In one embodiment, seven different regression algorithms may be used, which may include: linear regression; polynomial regression of order 2 and/or 3; lasso regression; ridge regression; elastic regression; and generalized additive model (GAM). Afterwards, the models derived from the different regression techniques may be combined into a dynamic weighted equation to get a desired "prediction function" which represents the perception model. Process 400 includes a new weighting calculation and optimization method where different weights may be computed and combined to get a final ensemble prediction function. With this method, the algorithm accuracy, reliability and robustness may effectively increase.

Referring back to FIG. 4, data of NKPIs stored in network performance database 160, DKPIs stored in UE device performance database 170, and/or data of APIs stored in observable applications characteristics database 315A may be divided into a training data set, a cross-validation data set, and a test data set.

In Blocks 410 1-N, using the training data set, ABQE 150 may generate N different regression algorithms to produce N different perception models. In Blocks 420 1-N, Using the cross-validation data set, ABQE 150 may determine the accuracy of each perception model i (where i=1, . . . , N) using cross validation dataset. The accuracy may be determined by computing predicated APIs using the perception models based on NKPIs and/or DKPIs in cross validation set. Differences between the predicted APIs and the APIs in the cross validation may be used to determine errors.

In Block 430, ABQE 150 may compute weights based on the errors generated in Blocks 420, and use the computed weights to perform a weighted combination of the perception models 410. The weights may be computed such that perception models having large errors in Block 430 are deemphasized, and perception models having small errors are emphasized. The weights may be refined using a least squares method until the value of the weights converge. Results of the regression prediction are weighted to get a final prediction function for the perception model. In Block 440, ABQE 150 may test the final prediction function using a test data set to verify the algorithm.

Figure 5:
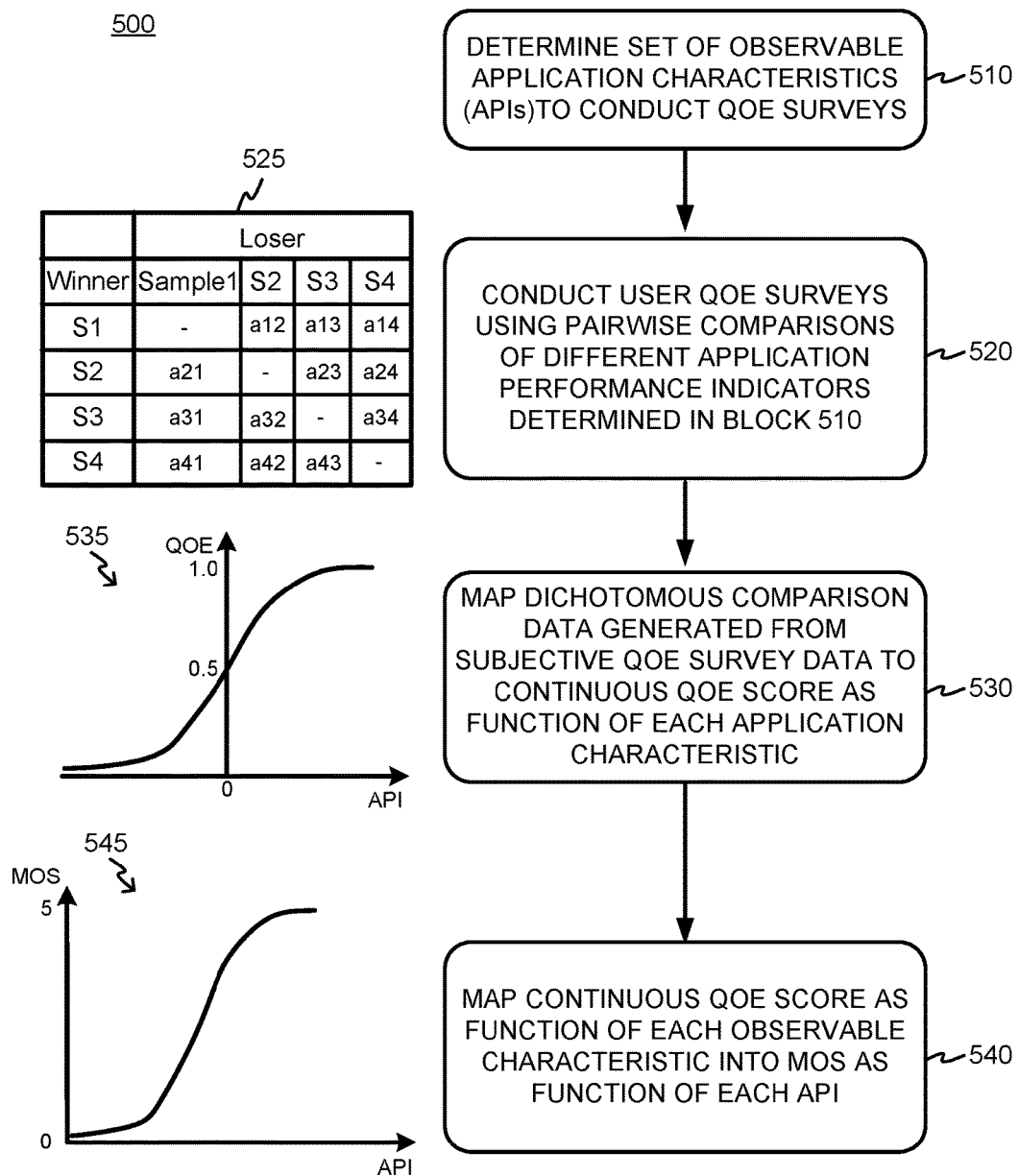
FIG. 5 is a flowchart illustrating an exemplary process for determining QoE preferences data and a QoE model.

FIG. 5 is a flowchart illustrating an exemplary process 500 for determining a quality of experience (QoE) preferences data (e.g., QoE survey data) and a QoE model for a particular application based on the QoE preferences data. Various blocks in process 500 may be performed on ABQE 150 (e.g. 510, 530 and 540), or in part on ABQE 150 with the assistance of another computing device (e.g., 510), where other blocks may be performed on UEs 105 (e.g., Block 520).

Process 500 may begin determining application quality of experience indicators (APIs) representing observable characteristics for a particular application (Block 510). Block 510 may be determined by ABQE 150 and/or another computing device. Because the QoE model may be directly based upon user preferences determined in Block 520 described below, the APIs selected for a particular application should be chosen so they correlate strongly with the users' perception of performance for the particular application of interest. Thus, the APIs should be observable application characteristics selected based on their relationships with user perception for a particular application. The APIs may be empirically selected based on a designer's experience and/or through historical information (e.g., past QoE surveys) which are known to have a noticeable impact on user satisfaction for the application of interest. For example, as described above in reference to FIG. 3B, when the application under consideration is a web browser, the APIs may include latency and data throughput.

In Block 520, process 500 may include conducting user surveys using pairwise comparisons of different API values to subjectively score user QoE for the particular application of interest. The surveys are designed to determine the preferability of an application while the application is executed with a variety of different observable application characteristics, or in other words, with various combinations of different values for selected APIs. The user survey may be performed on UEs 150, and conducted using many users over a specific period of time or in an ongoing manner. Accordingly, the survey data may be amassed over time as a crowd mining effort which includes significant amounts of data (e.g., so called "big data"). UEs 105 may internally buffer their own survey data in an internally stored UE log, which may be transferred via LTE network 102 to UE device performance database 170. UE device performance database 170 may collect and store all of the subjective survey data 190 from UEs 105 in LTE network 102.

Specifically, the surveys may involve users making preference selections while running the particular application using different combinations of API values, where the combinations of API values are called "sample sets $S_i$." The user selections may be dichotomous choices between two sample sets $S_i$ and $S_j$, where the user may simply designate a "winner" and a "loser" between two selections. The selections may be tracked over many users, and scores describing winners and losers between sample sets Si and Sj may be tallied and subsequently used to determine the QoE model.

In mathematical terms, the surveys may be conducted using different sample sets $S_i$, where $$S_i = (API(i)_1, \ldots, API(i)_M)$$

where:
- i=1, . . . , L, and L is the number of different sample sets being used in the survey;
- j=1, . . . , M, and M is the number of different types of APIs selected for the particular application; and
- $API(i)_j$ is a particular value of an observable application characteristic for the $i^{th}$ sample set $S_i$.

For example, if the particular application is a web browser, the user may make a preference selection using UE 105-$i$ among different instances of the web browser which is executing under different combinations of latency and throughout values. Thus, a particular sample set may be, for example:

$$S_1 = (Latency(1), Throughput(1)) = (1.1 \text{ seconds}, 16.8 \text{ Mbits/sec}).$$

Referring back to FIG. 5, chart 525 shows an exemplary organization of survey results where four sample sets ($S_1, \ldots, S_4$) are arranged into a matrix (i.e., in this example, L=4). The rows in chart 525 are indicative of sample sets that were selected as "winners," and columns in chart 525 are indicative of sample sets that were selected as "losers." The matrix elements $a_{i,j}$ are counter values where $S_i$ was indicated as a winner over $S_j$. As will be described below in reference to Block 530, the matrix elements may be used develop the QoE model using statistical techniques.

Depending upon the application of interest, the number of different types of APIs, along with the ranges of discrete values over which the APIs may be tested, could lead to an extremely large number of sample set Si combinations for which to test in order to develop the QoE model for the application of interest. In order to reduce the number of sample sets S to improve the efficiency of the surveys, techniques used in the design of experiments may be employed to select an optimum (or at least preferred) group of sample sets S for which to conduct the user surveys. In an embodiment, Taguchi design techniques may be used to select the API values used in the combination of sample sets. Taguchi designs may produce an orthogonal array of combinations of API values which may in used to select optimal, or at least improved, combination of API values for sample sets S.

Referring back to FIG. 5, in Block 530, ABQE 150 may map the dichotomous user QoE survey data (determined in Block 520) into a continuous QoE score as a function of each API. ABQE 150 may utilize the Bradley-Terry-Luce (BTL) model to objectively transform the pairwise decision data represented in chart 525 into a continuous QoE score as a function of each API. The BTL model states that the probability of a user choosing $S_i$ over $S_j$ (i.e., $S_i$ winning the comparison with $S_j$) may be represented by the symbol $\pi_{i,j}$, and is related to the counter values shown in chart 525 by the following equation:

$$\Pi_{i,j} = \frac{a_{ij}}{a_{ij} + a_{ji}} = \frac{\Pi(s_i)}{\Pi(s_i) + (s_j)} = \frac{e^{u(s_i)-u(s_j)}}{1 + e^{u(s_i)-u(s_j)}},$$

where $$u(S_k) = \log \Pi(S_k),$$

may be obtained using maximum likelihood estimation. The numerals $u(S_k)$, k=1, 2, ..., L are comparable with each other on an interval scale, and may be chosen as the raw estimates of QoE scores for $S_1, S_2, \ldots, S_L$, respectively. To facilitate interpretation, ABQE 150 may shift and normalize the raw estimates to within [0, 1], wherein the sample set $S_{best}$ with the best QoE scores 1, and the sample set $S_{worst}$ with the worst QoE scores 0. Diagram 535 shows an exemplary QoE model (also referred to as a "continuous QoE score:) as a function of a particular API.

In an embodiment ABQE 150 may map each continuous QoE score for each API (observable application characteristic) into a mean opinion score (MOS) as a function of each API (Block 540). The MOS ranges from 0 to 5, and may be used to better compare preferences with traditional telecommunications services. Diagram 545 shows an exemplary MOS model as a function of a particular API.

Figure 6:
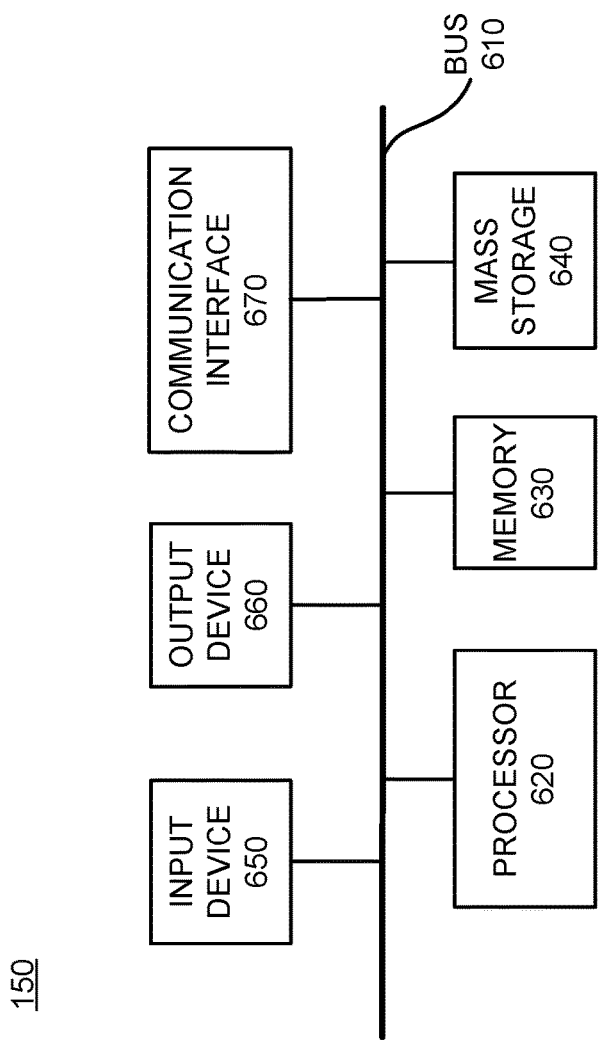
FIG. 6 is a diagram illustrating exemplary components within an application based QoE evaluator (ABQE) according to an embodiment.

FIG. 6 is a block diagram showing exemplary components of an application based QoE Evaluator (ABQE) 150 according to an embodiment. ABQE 150 may include a bus 610, a processor 620, a memory 630, mass storage 640, an input device 650, an output device 660, and a communication interface 670.

Bus 610 includes a path that permits communication among the components of ABQE 150. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an application-specific integrated circuit (ASIC), a field-programmable gate array (FPGA), and/or another type of integrated circuit or processing logic. For example, processor 620 may be an x86 based CPU, and may use any operating system, which may include varieties of the Windows, UNIX, and/or Linux. Processor 620 may also use high-level analysis software packages and/or custom software written in any programming and/or scripting languages for interacting with other network entities are communicatively coupled to WAN 140.

Memory 630 may include any type of dynamic storage device that may store information and/or instructions, for execution by processor 620, and/or any type of non-volatile storage device that may store information for use by processor 620. For example, memory 630 may include a RAM or another type of dynamic storage device, a ROM device or another type of static storage device, and/or a removable form of memory, such as a flash memory. Mass storage device 640 may include any type of on-board device suitable for storing large amounts of data, and may include one or more hard drives, solid state drives, and/or various types of redundant array of independent disks (RAID) arrays. For ABQE 150, mass storage device 640 may be suitable for storing files associated with traffic data, network performance data, observable application characteristics data, subjective QoE survey data, and/or desired network parameters for improving the performance of LTE network 102. ABQE 150 may use the stored data to generate and utilize perception models and QoE models.

Input device 650, which may be optional, can allow an operator to input information into ABQE 150, if required. Input device 650 may include, for example, a keyboard, a mouse, a pen, a microphone, a remote control, an audio capture device, an image and/or video capture device, a touch-screen display, and/or another type of input device. In some embodiments, ABQE 150 may be managed remotely and may not include input device 650. Output device 660 may output information to an operator of ABQE 150. Output device 660 may include a display (such as an LCD), a printer, a speaker, and/or another type of output device. In some embodiments, ABQE 150 may be managed remotely and may not include output device 660.

Communication interface 670 may include a transceiver that enables ABQE 150 to communicate with network performance database 160, UE device performance database 170, WAN 140 and/or LTE network 102. The communications interface 670 may be configured for wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 670 may include a transmitter that converts baseband signals to RF signals and/or a receiver that converts RF signals to baseband signals. Communication interface 670 may be coupled to one or more antennas for transmitting and receiving RF signals. Communication interface 670 may include a logical component that includes input and/or output ports, input and/or output systems, and/or other input and output components that facilitate the transmission/reception of data to/from other devices. For example, communication interface 670 may include a network interface card (e.g., Ethernet card) for wired communications and/or a wireless network interface (e.g., a WiFi) card for wireless communications. Communication interface 670 may also include standard serial communications over a cable, and/or any other type of interface that converts data from one form to another form.

ABQE 150 may perform network management operations in response to processor 620 executing software instructions contained in a computer-readable medium, such as memory 630 and/or mass storage 640. The software instructions may be read into memory 630 from another computer-readable medium or from another device. The software instructions contained in memory 630 may cause processor 620 to perform processes described herein, such as, for example, process 700 depicted in FIG. 7. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of ABQE 150, in other implementations, ABQE 150 may include fewer components, different components, additional components, or differently arranged components than depicted in FIG. 6.

Figure 7:
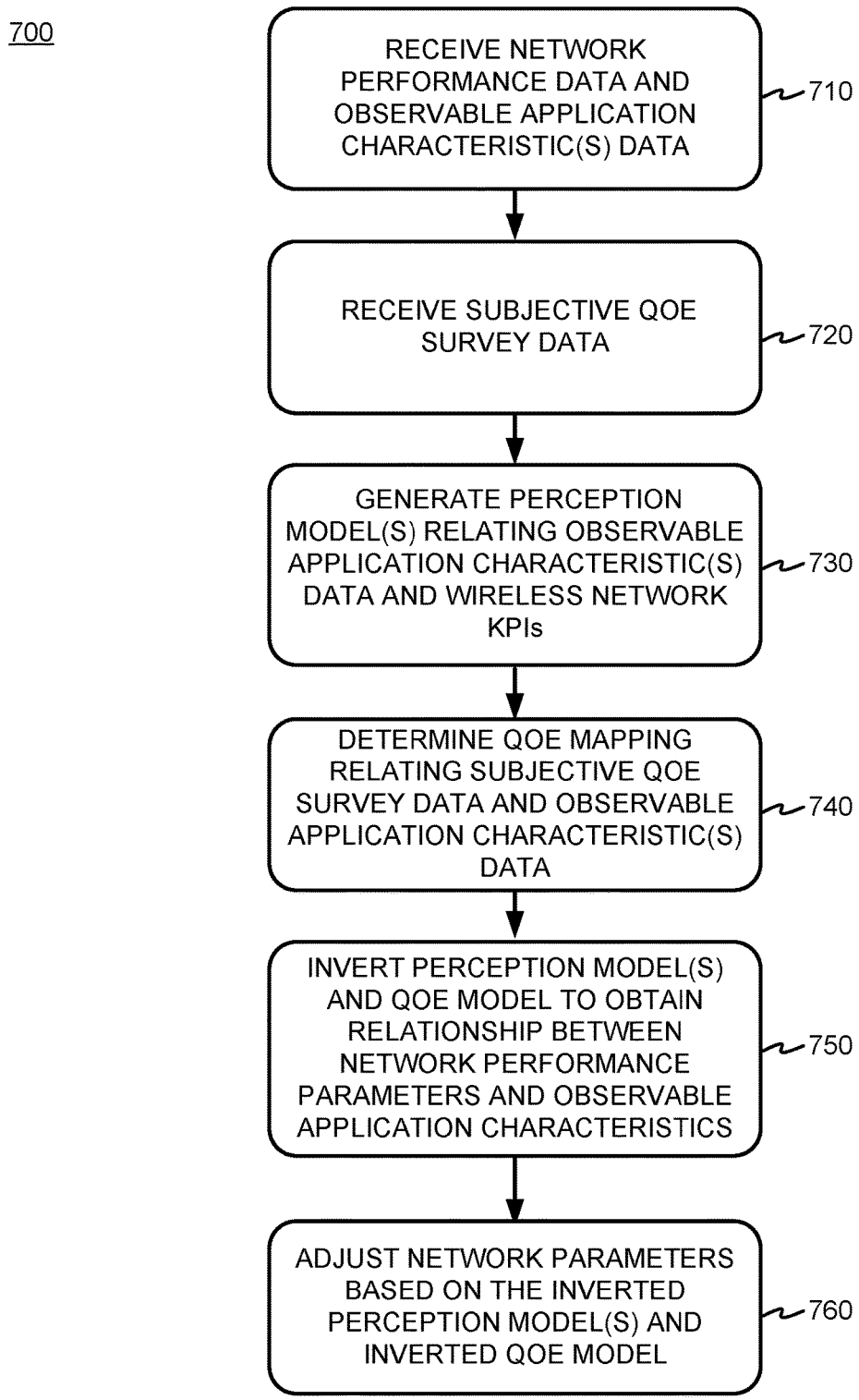
FIG. 7 is a flow chart showing an exemplary process for ABQE to evaluate and adjust parameters for an LTE network according to an embodiment.

FIG. 7 is a flow chart showing an exemplary process 700 evaluating and adjusting parameters for an LTE network according to an embodiment. Process 700 may be performed by a network device, such as, for example, ABQE 150. In an embodiment, ABQE 150 may receive network performance data associated with network key performance indicators, and receive data representing observable application characteristic(s) (Block 710). The network performance data may be received from network performance database 160, which may include various NKPIs, which may further include RFKPIs, NTDKPIs, and/or DKPIs. Data representing observable application characteristic(s) (APIs) may be received from observable application characteristics database 315A. ABQE 150 may then receive subjective QoE survey data 190 (Block 720). The subjective QoE survey data may be received from UE device performance database 170.

ABQE 150 may then generate perception model(s) which relate the data representing at least one observable application characteristic (e.g., APIs) and the network performance data (NKPIs and/or DKPIs) (Block 730). In an embodiment, ABQE 150 may generate the perception model(s) based on ensemble learning. To perform ensemble learning, ABQE 150 generate ensemble models which relate each observable application characteristic to API network performance parameters (e.g., NKPIs) using a training set of network performance data, where each of the ensemble models may be based on the application of a different regression algorithm. ABQE 150 may further determine errors for each of the generated ensemble models based on a cross validation set of network performance data, and generate a final ensemble model based on a weighted combination of the ensemble models. ABQE 150 may validate the final ensemble model based on a test set of network performance data.

In an embodiment, to generate the ensemble models, ABQE 150 may apply linear regression, polynomial regression of at least one of order 2 or order 3, lasso regression, ridge regression, elastic regression, and/or a generalized additive model using the training data set. ABQE 150 may further assign weights associated with a weighted combination based on determined errors for each of the generated ensemble models. ABQE 150 may iteratively calculate the weights using a least squares minimization until the weights converge.

ABQE 150 may determine a QoE model which relates subjective QoE survey data and the data representing at least one observable application characteristic (Block 740). In an embodiment, ABQE 150 may determine the QoE model by mapping dichotomous comparisons from the subjective QoE survey data to a continuous QoE score as a function of each application characteristic. ABQE 150 may determine the continuous QoE score based on a Bradley-Terry-Luce model. ABQE 150 may also determine a mean opinion score (MOS) by normalizing the continuous QoE score, where the MOS may be used to compare the application quality of experience with other telecommunication services.

ABQE 150 may invert the at least one perception model and invert the QoE model to obtain a relationship between network performance parameters and the at least one observable application characteristic (Block 750).

ABQE 150 may then adjust network parameters based on the at least one inverted perception model and the inverted QoE model (Block 760). For example, ABQE 150 may use the perception model(s) and the QoE model to perform root cause analysis of LTE network issues on a per application basis, and optimize (or at least improve) network performance for one or more selected applications executed on UEs 150. ABQE 150 may invert the QoE model to determine the range of values for the APIs that best improves the users' quality of experience for a particular application. Once the range of APIs values are determined, ABQE 150 may invert the perception model(s) to determine which combinations NKPIs and/or DKPIs best map to the determined range of API values. The determined values for the NKPIs and/or the DKPIs may be stored in desired network parameters database 350.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 3A-5 and 7, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for enhancing a subjective quality of experience (QoE) for a user application, comprising:
    receiving network performance data, wherein the network performance data includes measurable network key performance indicators;
    receiving data representing at least one observable user application characteristic;
    receiving subjective QoE survey data;
    generating at least one perception model which relates the data representing at least one observable user application characteristic and the network performance data;
    determining a QoE model which relates the subjective QoE survey data and the data representing at least one observable user application characteristic;
    determining at least one user application characteristic value that improves the QoE for the user application based on an inverse function of the QoE model;
    determining network performance parameters that map to the at least one user application characteristic value based on an inverse function for the at least one perception model; and
    adjusting a region of a network based on the determined network performance parameters.

2. The method of claim 1, wherein generating at least one perception model includes ensemble learning, wherein ensemble learning further comprises:
    generating ensemble models relating each observable user application characteristic to network performance parameters using a training set of network performance data, wherein each of the ensemble models is based on the execution of a different regression algorithm;
    determining errors for each of the generated ensemble models based on a cross validation set of network performance data;
    generating a final ensemble model based on a weighted combination of the ensemble models; and
    validating the final ensemble model based on a test set of network performance data.

3. The method of claim 2, wherein generating ensemble models further comprises:
    applying at least one of linear regression, polynomial regression of at least one of order 2 or order 3, lasso regression, ridge regression, elastic regression, or a generalized additive model.

4. The method of claim 2, wherein generating the final ensemble model further comprises:
    assigning weights associated with a weighted combination based on determined errors for each of the generated ensemble models.

5. The method of claim 4, wherein assigning the weights further comprises:
    iteratively calculating the weights using a least squares minimization until the weights converge.

6. The method of claim 1, wherein determining the QoE model further comprises:
    mapping dichotomous comparisons from the subjective QoE survey data to a continuous QoE score as a function of each user application characteristic.

7. The method of claim 6, further comprising:
    determining the continuous QoE score based on a Bradley-Terry-Luce model.

8. The method of claim 6, further comprising
    determining a mean opinion score (MOS) by normalizing the continuous QoE score.

9. A network device, comprising:
    an interface that communicates with a network;
    a memory configured to store instructions; and
    a processor, coupled to the interface and the memory, wherein the processor is configured to execute the instructions stored in the memory to:
        receive network performance data, wherein the network performance data includes measurable network key performance indicators,
        receive data representing at least one observable user application characteristic,
        receive subjective quality of experience (QoE) survey data,
        generate at least one perception model which relates the data representing at least one observable user application characteristic and the network performance data,
        determine a QoE model which relates the subjective QoE survey data and the data representing at least one observable user application characteristic,
        determine at least one user application characteristic value that improves the QoE for a user application based on an inverse function of the QoE model;
        determine network performance parameters that map to the at least one user application characteristic value based on an inverse function for the at least one perception model, and
        adjust a region of a network based on the determined network parameters.

10. The network device of claim 9, wherein the instructions to generate at least one perception model includes instructions for ensemble learning, further causing the processor to:
    generate ensemble models relating each observable user application characteristic to network performance parameters using a training set of network performance data, wherein each of the ensemble models is based on the execution of a different regression algorithm,
    determine errors for each of the generated ensemble models based on a cross validation set of network performance data,
    generate a final ensemble model based on a weighted combination of the ensemble models, and
    validate the final ensemble model based on a test set of network performance data.

11. The network device of claim 10, wherein the instructions to generate ensemble models further causes the processor to:
    apply at least one of linear regression, polynomial regression of at least one of order 2 or order 3, lasso regression, ridge regression, elastic regression, or a generalized additive model.

12. The network device of claim 10, wherein the instructions to generate a final ensemble model further causes the processor to:

assign weights associated with a weighted combination based on determined errors for each of the generated ensemble models.

13. The network device of claim 12, wherein the instructions to assign weights further cause the processor to:
iteratively calculate the weights using a least squares minimization until the weights converge.

14. The network device of claim 9, wherein the instructions to determine the QoE model further cause the processor to:
map dichotomous comparisons from the subjective QoE survey data to a continuous QoE score as a function of each user application characteristic.

15. The network device of claim 14, wherein the memory comprises instructions causing the processor to:
determine the continuous QoE score based on a Bradley-Terry-Luce model.

16. The network device of claim 14, wherein the memory comprises instructions causing the processor to:
determine a mean opinion score (MOS) by normalizing the continuous QoE score.

17. A non-transitory computer-readable medium comprising instructions, which, when executed by a processor, causes the processor to:
receive network performance data, wherein the network performance data includes measurable network key performance indicators;
receive data representing at least one observable user application characteristic;
receive subjective quality of experience (QoE) survey data;
generate at least one perception model which relates the data representing at least one observable user application characteristic and the network performance data;
determine a QoE model which relates the subjective QoE survey data and the data representing at least one observable user application characteristic;
determine at least one user application characteristic value that improves the QoE for a user application based on an inverse function of the QoE model;
determine performance parameters that map to the at least one user application characteristic value based on an inverse function for the at least one perception model; and
adjust a region of a network based on the determined network performance parameters.

18. The non-transitory computer-readable medium of claim 17, comprising further instructions causing the processor to:
generate ensemble models relating each observable user application characteristic to network performance parameters using a training set of network performance data, wherein each of the ensemble models is based on the execution of a different regression algorithm;
determine errors for each of the generated ensemble models based on a cross validation set of network performance data;
generate a final ensemble model based on a weighted combination of the ensemble models; and
validate the final ensemble model based on a test set of network performance data.

19. The non-transitory computer-readable medium of claim 18, wherein when generating ensemble models, instructions cause the processor to:
apply at least one of linear regression, polynomial regression of at least one of order 2 or order 3, lasso regression, ridge regression, elastic regression, or a generalized additive model.

20. The non-transitory computer-readable medium of claim 18 wherein when generating the final ensemble model, instructions cause the processor to:
assign weights associated with a weighted combination based on determined errors for each of the generated ensemble models.

* * * * *